(12) United States Patent
Kleczewski

(10) Patent No.: US 12,721,329 B2
(45) Date of Patent: Sep. 1, 2026

(54) OFFSET AXIS SPINNERBAIT

(71) Applicant: John Kleczewski, Park Falls, WI (US)

(72) Inventor: John Kleczewski, Park Falls, WI (US)

( * ) Notice: Subject to any disclaimer, the term of this patent is extended or adjusted under 35 U.S.C. 154(b) by 0 days.

(21) Appl. No.: 18/926,004

(22) Filed: Oct. 24, 2024

(65) Prior Publication Data

US 2026/0114435 A1 Apr. 30, 2026

(51) Int. Cl.
*A01K 85/10* (2006.01)
*A01K 85/00* (2006.01)
*A01K 85/01* (2006.01)

(52) U.S. Cl.
CPC ............ *A01K 85/10* (2013.01); *A01K 85/017* (2022.02); *A01K 85/1821* (2022.02); *A01K 85/1837* (2022.02)

(58) Field of Classification Search
CPC ...................................................... A01K 85/10
See application file for complete search history.

(56) References Cited

U.S. PATENT DOCUMENTS 1,874,883 A * 8/1932 Emmett ................. A01K 85/10 43/42.19
3,943,651 A * 3/1976 Erving .................. A01K 85/10 43/42.11
4,003,154 A 1/1977 Carver
4,090,319 A * 5/1978 Wolfe .................... A01K 85/10 43/42.49
4,209,932 A * 7/1980 Pate ...................... A01K 85/00 43/42.11
4,447,981 A * 5/1984 Bauer .................... A01K 85/10 43/42.36
5,412,899 A 5/1995 Reboul
5,491,926 A * 2/1996 Mostovsky ............ A01K 85/10 43/42.11
5,499,470 A * 3/1996 Reed ...................... A01K 85/00 D22/129
6,173,521 B1 1/2001 Rockhill, Jr.
8,763,301 B2 7/2014 Lau
9,161,521 B2 * 10/2015 Thorne .................. A01K 85/14
9,888,676 B2 2/2018 Schwartz et al.
10,993,422 B1 5/2021 Maji
11,963,522 B2 4/2024 Bechel et al.
2012/0023805 A1 2/2012 Thorne
2019/0200590 A1 * 7/2019 Richardson ............ A01K 85/10
2023/0263144 A1 8/2023 Bogan

FOREIGN PATENT DOCUMENTS

CA 2849291 C 6/2015

* cited by examiner

*Primary Examiner* — Richard G Davis
(74) *Attorney, Agent, or Firm* — Hansen Reynolds LLC

(57) ABSTRACT

A fishing lure, which is attachable to fishing line for movement through water in a fishing direction, includes a first section, a spinner blade, a second section, a transition section, and a fishing hook coupled to the second section. The first section includes a leading end and a trailing end. The leading end is configured for attachment to the fishing line. The spinner blade is rotatably coupled to the first section between the leading end and the trailing end for rotation about a spinner axis. The second section is in a trailing position relative to the first section during the movement of the fishing lure through the water. A central axis of the second section is offset form the spinner axis in a direction that is perpendicular to the fishing direction. The transition section connects the trailing end of the first section to the second section.

20 Claims, 11 Drawing Sheets

122
122
101
110
1002
112
1008
104
1004
136
1006
108
116
114
1000

OFFSET AXIS SPINNERBAIT

TECHNICAL FIELD

This disclosure relates generally to a fishing lure, and, for example, to a spinnerbait having an offset axis.

BACKGROUND

Fishing lures come in a wide variety of designs to attract predatory fish by imitating swimming motions, sounds, and/or vibrations associated with prey. A spinnerbait is a particular type of fishing lure that includes one or more spinner blades that function like a spinning propeller when the fishing lure is in motion. In addition to appealing to visual systems of fish, by creating flashing reflections, spinner blades also target the auditory and lateral line systems of fish by creating turbulence and noise. Vibrational and auditory features of spinnerbait are particularly important in situations where fish have a reduced ability to see, such as in murky water or at night.

SUMMARY

In some aspects, a fishing lure is provided that is attachable to fishing line for movement through water in a fishing direction. The fishing lure includes a first section, a spinner blade, a second section, a transition section, and a fishing hook. The first section includes a leading end and a trailing end opposite the leading end. The Leading end is configured for attachment to the fishing line. The spinner blade is rotatably coupled to the first section between the leading end and the trailing end for rotation about a spinner axis. The second section is configured as bait and is in a trailing position relative to the first section during the movement of the fishing lure through the water. A central axis of the second section is offset from the spinner axis in a direction that is perpendicular to the fishing direction. A transition section connects the trailing end of the first section to the second section. The fishing hook is coupled to the second section.

The second section may be weighted such that the second section travels at a depth in the water that is deeper than a depth of the first section during the movement of the fishing lure through the water. The first section may include at lest one first bead, and the second section may include at least one second bead. At least two of the first section, the second section, and the transition section may be formed of a single, continuous length of wire. The fishing lure may include an additional spinner blade rotatably coupled to the first section for rotation about the spinner axis. The second section may be configured as at least one of deer hair skirting, marabou feather skirting, rubber skirting, artificial hair skirting, tinsel skirting, and an animal-resembling body. During the movement of the fishing lure through the water and during rotation of the spinner blade about the spinner axis, the spinner blade strikes at least one of the transition section and the second section to generate sound.

In other aspects, a fishing lure is provided that is attachable to a fishing line for movement through water in a fishing direction. The fishing lure includes a first section, a spinner blade, a second section, a transition section, and a fishing hook. The first section includes a leading end and a trailing end opposite the leading end. The leading end is configured for attachment to the fishing line. The spinner blade is coupled to the first section for rotation about a spinner axis. The second section is in a trailing position relative to the first section during the movement of the fishing lure through the water. A central axis of the second section is offset from the spinner axis in a direction that is perpendicular to the fishing direction. The second section is weighted such that the second section travels at a depth in the water that is deeper than a depth of the first section during the movement of the fishing lure through the water. The transition section connects the trailing end of the first section to the second section. The fishing lure is coupled to the second section.

The first section may form a first end of the fishing lure, and the second section may form a second end of the fishing lure. The transition section may fixedly connect the trailing end of the first section to the second section. At least one of the first section and the second section may include a linear section of wire. The second section may include one or more of deer hair skirting, marabou feather skirting, rubber skirting, artificial hair skirting, tinsel skirting, and an animal-resembling body. The transition section and the first section may connect to define a first bend in a material, and the transition section and the second section may connect to define a second bend in the material. The material may be a one-piece, integral structure that forms the first section, the second section, and the transition section.

In other aspects, a fishing lure is provided that is attachable to a fishing line for movement through water in a fishing direction. The fishing lure includes a first section, a spinner blade, a second section, a transition section, and a fishing hook. The first section is configured to attachment to the fishing line and defines a spinner axis. The spinner blade is rotatably coupled to the first section for rotation about the spinner axis. The second section is in a trailing position relative to the first section during the movement of the fishing lure through the water. The second section defines a central axis that is axially offset from the spinner axis in a direction that is perpendicular to the fishing direction. The transition section connects the first section to the second section. The fishing hook is coupled to the second section. During movement of the fishing lure through the water, the spinner blade rotates about the spinner axis and strikes at least one of the transition section and the second section to generate sound.

The first section may include a first eyelet for connection to the fishing line, and the second section may include a second eyelet that is coupled to the fishing hook. The fishing lure may have a center of gravity that causes the second section to travel at a depth in the water that is deeper than a depth of the first section during the movement of the fishing lure through the water. The first section may be a first linear section of a first material, and the second section may be a second linear section of a second material. The first material may have a same material composition as the second material. A length of the transition section may be less than a length of the first section, and the length of the transition section may be less than a length of the second section.

Figure 1:
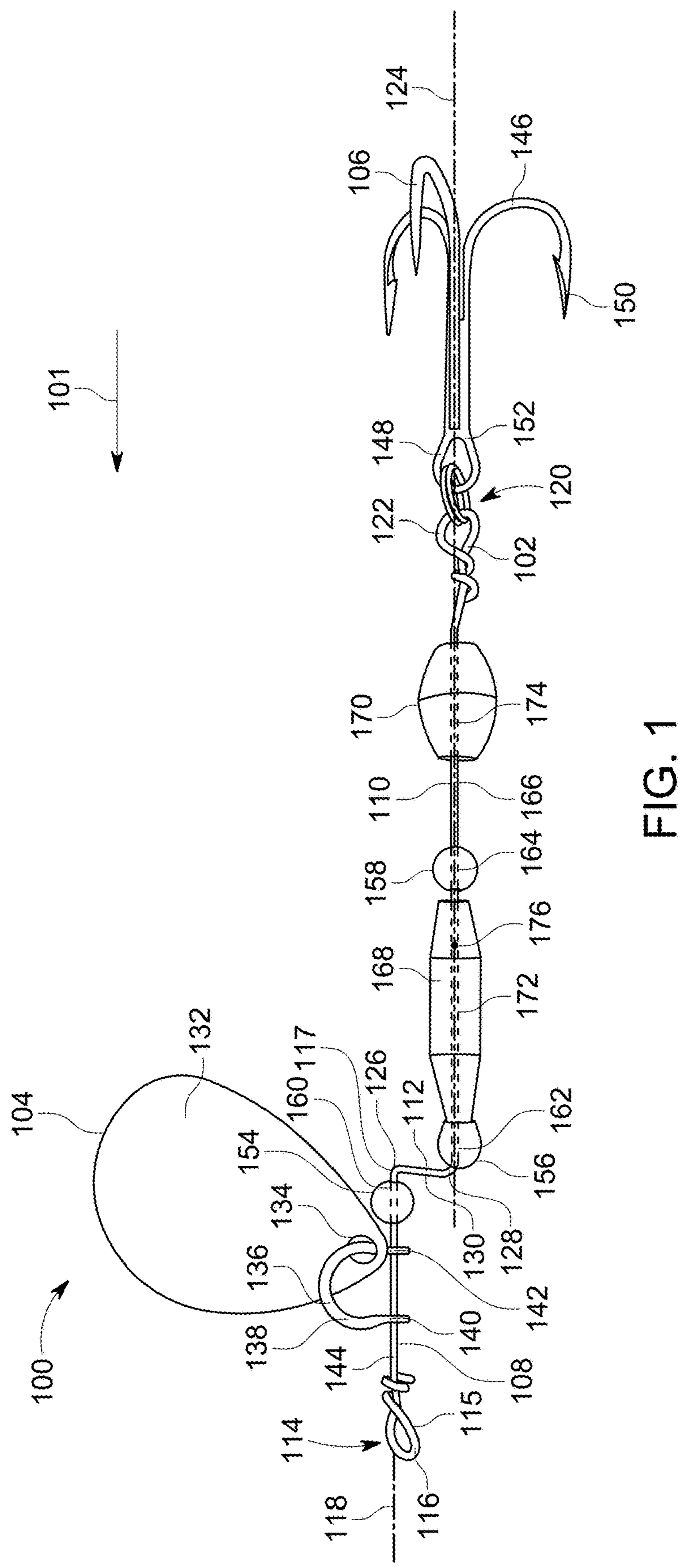
FIG. 1 is a side view of an example fishing lure, in accordance with one or more aspects of the present disclosure.

Before any exemplary configurations of the present disclosure are explained in detail, it is to be understood that the present disclosure is not limited in its application to the details of construction and the arrangement of components set forth in the following description or illustrated in the accompanying drawings. The present disclosure is capable of other configurations and of being practiced or of being carried out in various ways. Also, it is to be understood that the phraseology and terminology used herein is for the purpose of description and should not be regarded as limiting.

DETAILED DESCRIPTION

This disclosure relates to a fishing lure, which may be used with a fishing line and a rod in a fishing operation, such as a trolling fishing operation, a casting fishing operation, and/or the like.

To simplify explanation below, the same reference characters may be used to denote the same or similar features. The drawings may not be to scale.

Figure 6:
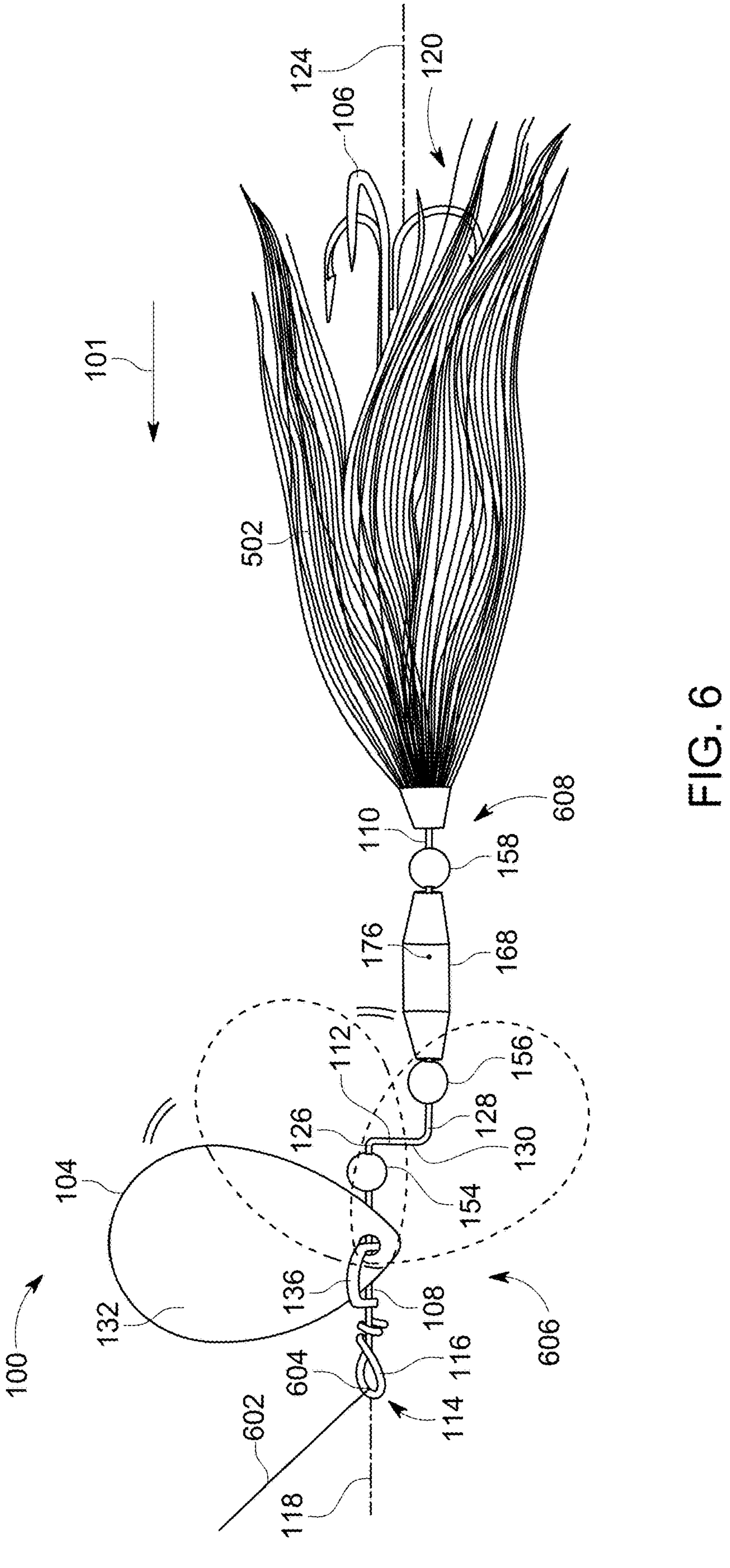
FIG. 6 is a side view of the fishing lure of FIG. 1 in use with a fishing line, in accordance with one or more aspects of the present disclosure.

FIG. 1 illustrates an example fishing lure 100 that, as discussed further below, may be pulled through the water in a fishing direction 101. The fishing lure 100 includes a frame 102, a spinner blade 104, and a fishing hook 106. The frame 102 is an elongated structure that includes a first section 108, a second section 110, and a transition section 112 extending therebetween. The first section 108, which forms a first end 114 of the fishing lure 100, may include a leading end 115 defining a first eyelet 116 to enable attachment to a fishing line 602 (e.g., as shown in FIG. 6), and a trailing end 117 opposite the leading end 115. The first section 108, which may be substantially linear along a length thereof, defines a spinner axis 118 therealong. The second section 110, which forms a second end 120 of the fishing lure 100, may include a second eyelet 122 to enable the fishing hook 106 to be coupled thereto. The second section 110, which may be substantially linear along a length thereof, defines a central axis 124 therealong that is substantially parallel to the spinner axis 118. For reasons that will be described below, the length of the second section 110 may be greater than the length of the first section 108. The transition section 112, which may have a length that is respectively less than the length of the first section 108 and the length of the second section 110, connects to the trailing end 117 of the first section 108 to define a first bend 126. The transition section 112 further connects to the second section 110 to define a second bend 128. Due to the shape and arrangement of the transition section 112 relative to the first section 108 and the second section 110, the second section 110 is axially offset from the first section 108 in a direction that is perpendicular to the fishing direction 101.

While the transition section 112 is further shown as having a substantially linear portion 130 extending between the first bend 126 and the second bend 128, it should be understood that other shapes of the transition section 112 are possible. For example, the first bend 126 may be directly connected to the second bend 128 (e.g., to create an "S" shape). As another example, the transition section 112 may include one or more additional bends between the first bend 126 and the second bend 128 (e.g., to create an undulating shape). Additional examples of transition sections are described below in connection with FIGS. 7-11.

The frame 102 may be formed of one or more materials (e.g., wire material, such as stainless steel wire, copper wire, aluminum wire, plastic material, and/or the like). For example, the frame 102 may be a one-piece, continuous, and integral length of material (e.g., stainless steel wire, copper wire, aluminum wire, another type of wire, molded plastic, and/or the like). As another example, at least one section of the frame 102 (e.g., the first section 108) may be in the form of one type of material, and another section of the frame 102 (e.g., the second section 110 and/or the transition section 112) may be in the form of another type material. In such an example, one or more of the first section 108, the second section 110, or the transition section 112 may be fixedly secured together by welding, soldering, adhesive, tying, joining with a split ring, and/or the like.

The spinner blade 104 is an oblong structure that is movably coupled to the first section 108 for rotation about and other movement relative to the spinner axis 118. To visually attract fish, the spinner blade 104 may be formed of a shiny, reflective material such as metal. While a variety of specific shapes are possible to create turbulence and vibration in the water (e.g., a Colorado blade shape, a Willowleaf blade shape, an Indiana blade shape, an Oklahoma blade shape, a French blade, and/or the like), the spinner blade 104, as shown in FIG. 1, includes a rounded, concave body 132. The rounded, concave body 132 includes a hole 134 for receiving a clevis 136 for a movable attachment to the first section 108. While the clevis 136, as described below and shown in the figures, is a u-shaped clevis, it should be understood that other types of clevises are possible, such as an s-shaped clevis, a w-shaped clevis, and/or the like.

Figure 2:
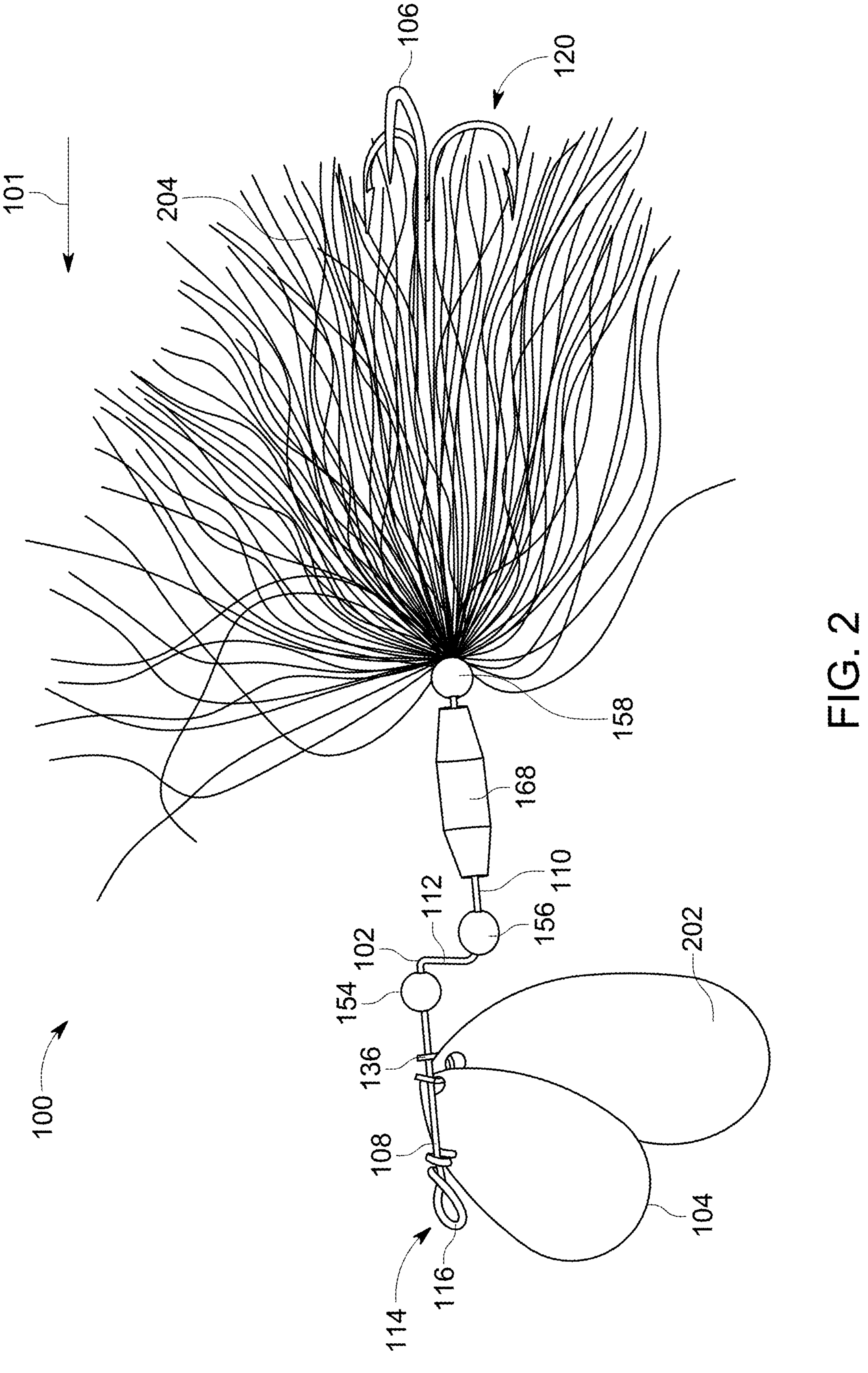
FIG. 2 is a side view of the fishing lure of FIG. 1 having bait in accordance with a first embodiment of the present disclosure.

The clevis 136 has a u-shaped body 138 that includes a first end opening 140 and a second end opening 142 for slidably receiving a first linear portion of the first section 108. As assembled with the first section 108, the clevis 136 and the spinner blade 104 are configured to slidably and rotatably move relative to the first section 108. For reasons that will be discussed below, the spinner blade 104 has a length that is greater than or equal to the length of the transition section 112. In some implementations (e.g., as shown in FIG. 2), the fishing lure 100 may include multiple spinner blades (e.g., a spinner blade 104 and a spinner blade 202, and/or the like) coupled to the first section 108 via one or more clevises (e.g., one or more of the clevis 136, one or more of an s-shaped clevis, one or more of a w-shaped clevis, and/or the like). In such a case, the fishing lure 100 may include multiple of a same type of spinner blade and/or different types of spinner blades.

The fishing hook 106 has a curved body 146 with a proximal end 148 and a pointed distal end 150. The proximal end 148 includes an eye 152 that is configured to be attached (e.g. directly attached, attached via an intermediate ring as shown in FIG. 1, and/or the like) to the second eyelet 122 of the frame 102. The pointed distal end 150 is configured to pierce an inside of a mouth of a fish during a fishing operation, as will be described below. While the fishing hook 106 is shown in FIG. 1 in the form of a treble hook, other types of fishing hooks are possible. For example, the fishing hook 106 may be a bait hook, a jig hook, a weedless hook, a circle hook, or another type of hook. To withstand forces associated with the fishing operation, the fishing hook 106 may be made of a strong, durable material such as steel, carbon steel, vanadium steel, stainless steel, and/or the like.

In some implementations, to create additional fish-attracting visual and audio effects, the fishing lure 100 may further include, as an example, a first bead 154, a second bead 156, and a third bead 158. The first bead 154 includes a first bead bore 160 that slidably receives the first linear portion 144 of the first section 108 between the spinner blade 104 and the transition section 112. The second bead 156 and the third bead 158 respectively include a second bead bore 162 and a third bead bore 164 that slidably receive a second linear portion 166 of the second section 110. While the fishing lure 100 is shown with three, substantially spherical beads in this example, it should be understood that that the fishing lure 100 may include a different quantity of beads, a different arrangement of beads, beads having different shapes, and/or the like, depending on relative sizes of other components on the fishing lure 100, the environment in which the fishing lure 100 is used, and/or the like. Beads may be hollow or solid and may be formed of plastic, glass, metal (e.g., brass, tungsten, and/or the like), or another type of material.

Additionally, or alternatively, to convincingly mimic movement of prey, the fishing lure 100 may include, as an example, a first weight 168 and a second weight 170 on the second section 110. The first weight 168 includes a first weight bore 172 that slidably receives the second linear portion 166 of the second section 110 between the first bead 154 and the second bead 156. The second weight 170 includes a second weight bore 174 that likewise slidably receives the second linear portion 166 of the second section 110 between the third bead 158 and the fishing hook 106. By including the first weight 168 and the second weight 170 on the second section 110, the fishing lure 100 has a center of gravity 176 that causes the second section 110 to travel at a depth in water that is deeper than a depth of the first section 108 during a fishing operation. It should be understood, however, that other arrangements and/or quantity of weights on the second section are possible to achieve such a weight distribution. As another example, in addition to, or as alternative to the first weight 168 and the second weight 170, the second section 110 may itself be weighted, for example by being formed of a material or combinations of material that is/are heavier than a material of the first section 108 and/or the transition section 112.

Figure 3:
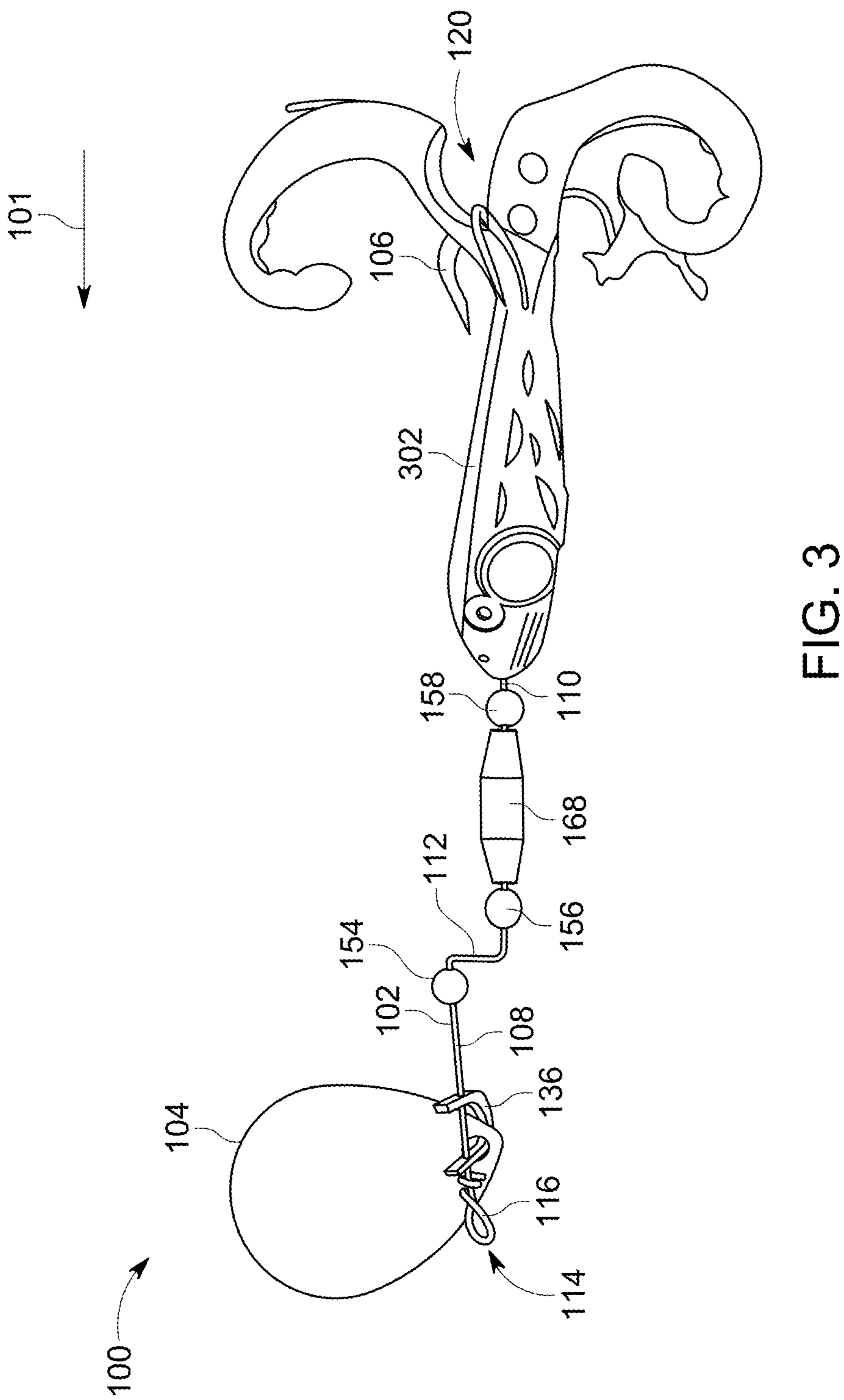
FIG. 3 is a side view of the fishing lure of FIG. 1 having bait in accordance with a second embodiment of the present disclosure.
Figure 4:
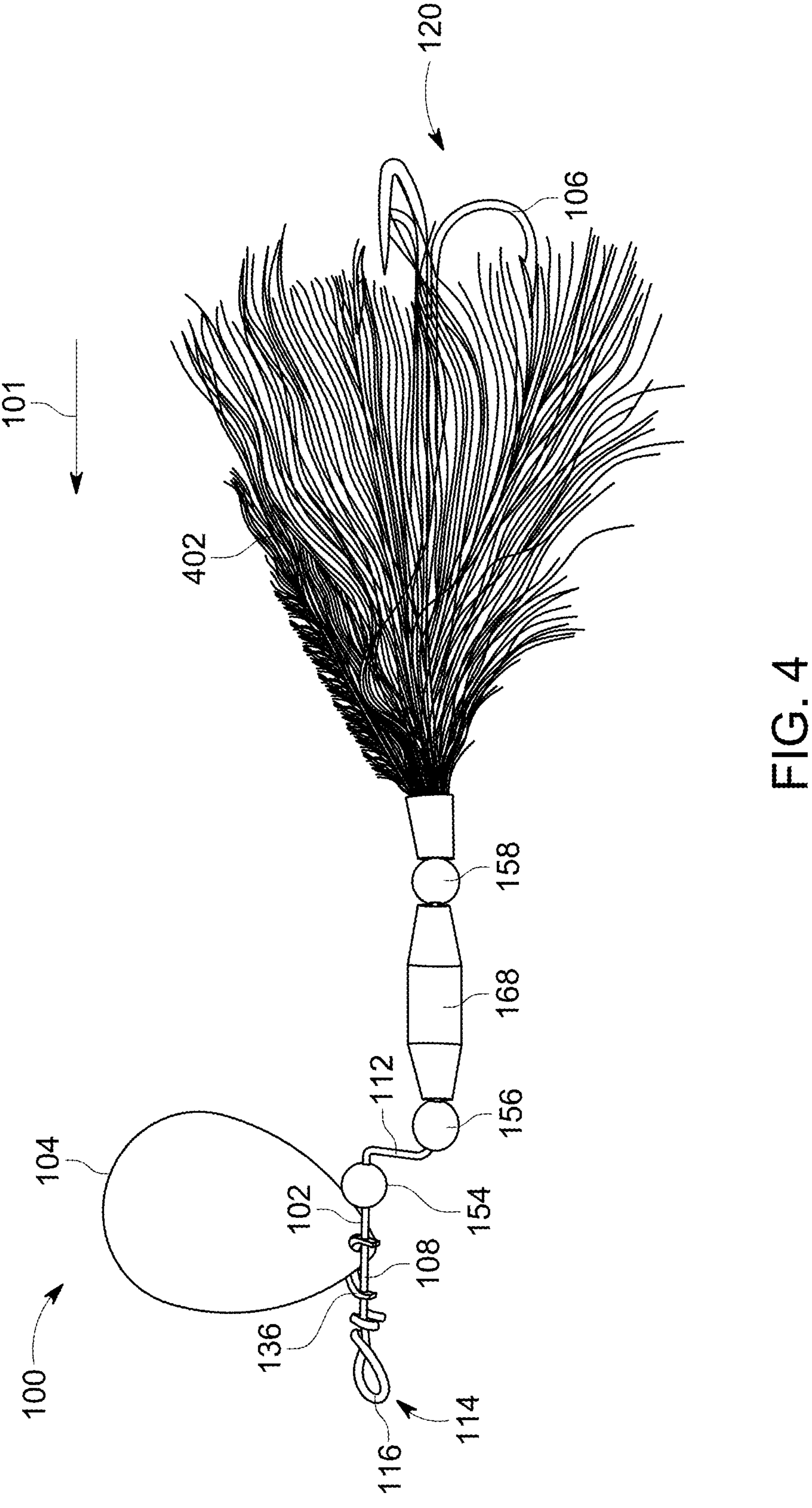
FIG. 4 is a side view of the fishing lure of FIG. 1 having bait in accordance with a third embodiment of the present disclosure.
Figure 5:
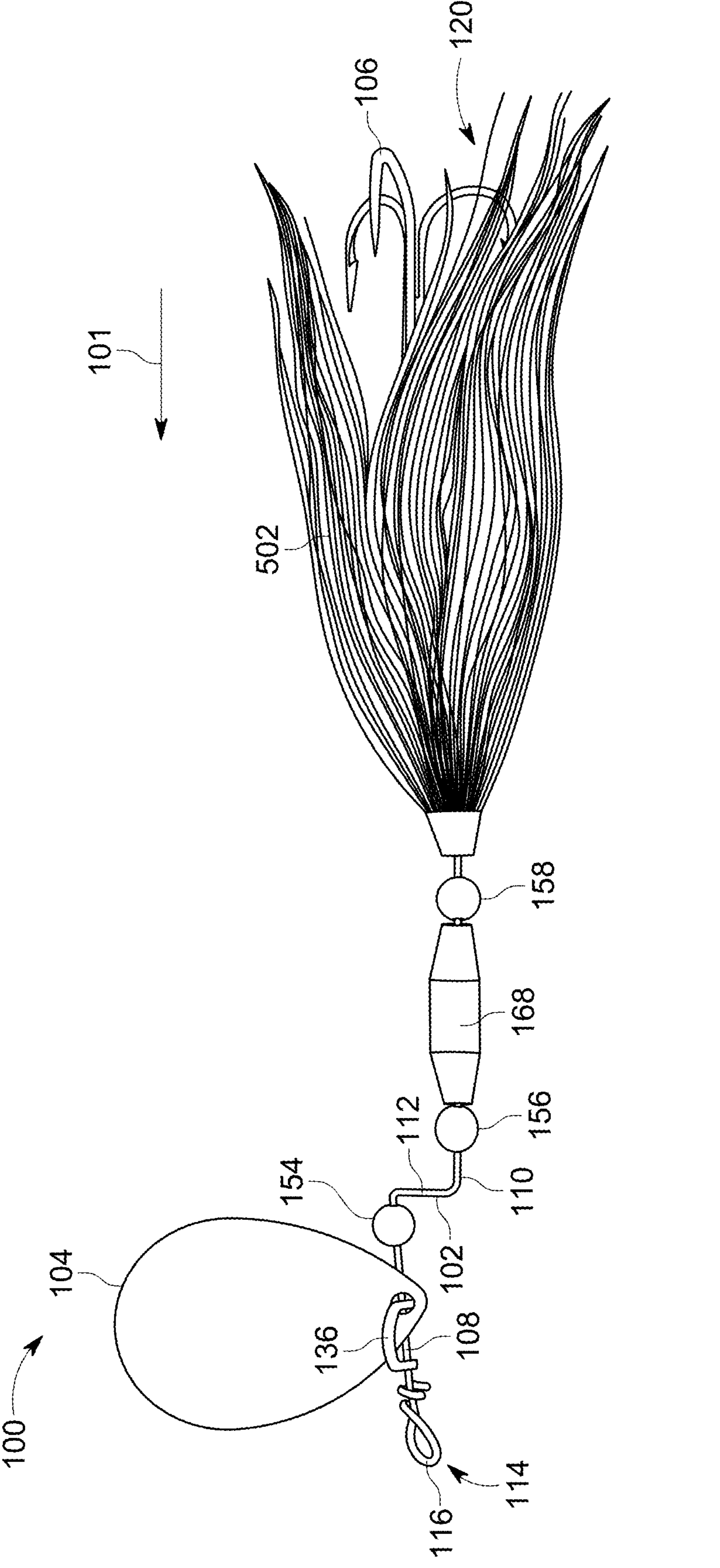
FIG. 5 is a side view of the fishing lure of FIG. 1 having bait in accordance with a fourth embodiment of the present disclosure.

While, to facilitate explanation, the fishing lure 100 is shown in FIG. 1 as not including bait, it should be understood that structure configured as bait may be arranged on or otherwise integrated into the second section 110 (e.g., between the third bead 158 and the second weight 170). In this regard, the second section 110 may be or include structure configured as bait. FIGS. 2-5 illustrate different examples of structure configured as bait that may be attached to, or otherwise integrated into, the fishing lure 100. For example, FIG. 2 shows bait 204 in the form of tinsel skirting. As another example, FIG. 3 shows bait 302 in the form of an animal-resembling body, which may be formed of wood, rubber, plastic, silicone, and/or the like. As another example, FIG. 4 shows bait 402 in the form of marabou feather skirting. As a further example, FIG. 5 shows bait 502 in the form of deer hair skirting. It should be understood that other types of bait are possible, including rubber skirting, artificial hair skirting, other shapes of animal-resembling bodies, combinations of the foregoing, and/or the like.

FIG. 6 illustrates an example use of the fishing lure 100. In use, during a fishing operation (e.g., a casting fishing operation, a trolling fishing operation, and/or the like), a user may secure the first eyelet 116 of the fishing lure 100 to an end 604 of a fishing line 602. After placing the fishing lure 100 in water, the user may cause the fishing lure 100 to travel in the fishing direction 101 through the water (e.g., by reeling in the fishing line during a casting fishing operation, by pulling the fishing line behind a boat during a trolling fishing operation, and/or the like). During movement of the fishing lure 100 through the water, the first section 108 travels in a leading position 606 along the fishing direction 101, and the second section 110 travels in a trailing position 608 along the fishing direction 101. As the fishing lure 100 moves through the water, a force of the water on the spinner blade 104 causes the spinner blade 104 to rotate about the spinner axis 118, creating turbulence and vibrations in the water. Due to the shape, size and arrangement of the transition section 112 relative to the spinner blade 104, as the spinner blade 104 rotates, it repeatedly strikes the transition section 112 (e.g., one or more of the first bend 126, the second bend 128, or the substantially linear portion 130), generating a sound that appeals to auditory and lateral line senses of the sought-after predatory fish. It has been determined that the spinner blade 104 striking the transition section 112 generates sound that is unexpectedly loud and that has a frequency unlike sounds generated by other fishing lures that are specifically provided with sound generating mechanisms (e.g., BBs, rattles, and/or the like). In some implementations, depending on the length and striking angle of the spinner blade 104, the spinner blade 104 may alternatively strike the second section 110 or a portion thereof, or may strike both the transition section 112 and the second section 110.

Furthermore, because the second section 110 is weighted to have a weight that is greater than a weight of the first section 108, the resulting location of a center of gravity 176 of the fishing lure 100 causes the second section 110 to travel at a depth in the water that is deeper than a depth of the first section 108 when the fishing lure 100 moves through the water in the fishing direction 101. The axially-offset and weighted nature of the second section 110 relative to the first section 108 causes the second section 110 to function as a keel that tends to maintain the relative vertical orientation of the first section 108 and the second section 110 as the fishing lure 100 moves through the water. As such, the fishing lure 100 moves through the water along the fishing direction 101 with a smoothness and balance that resembles movement of prey, further attracting predatory fish.

Figure 7:
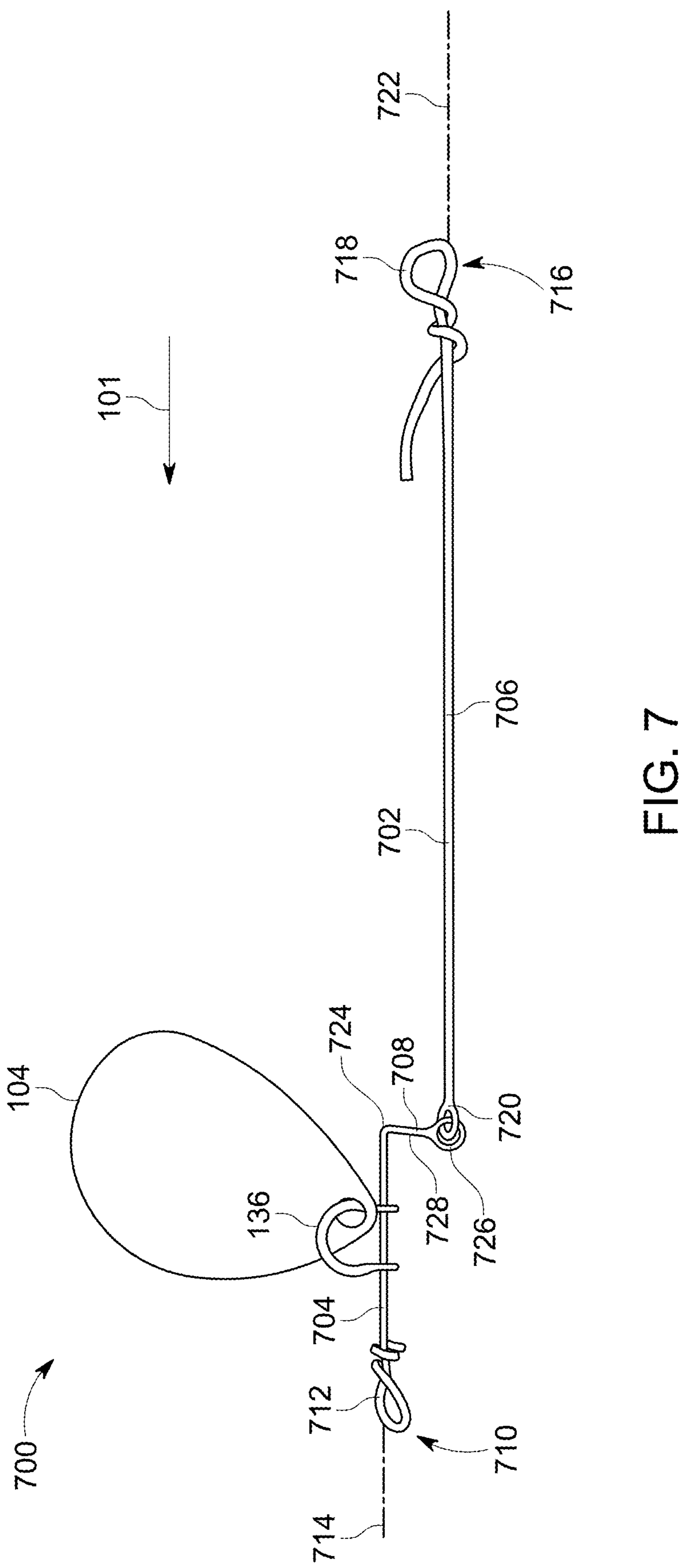
FIG. 7 is a side view of an example fishing lure having a first alternative embodiment of a frame, in accordance with one or more aspects of the present disclosure.
Figure 8:
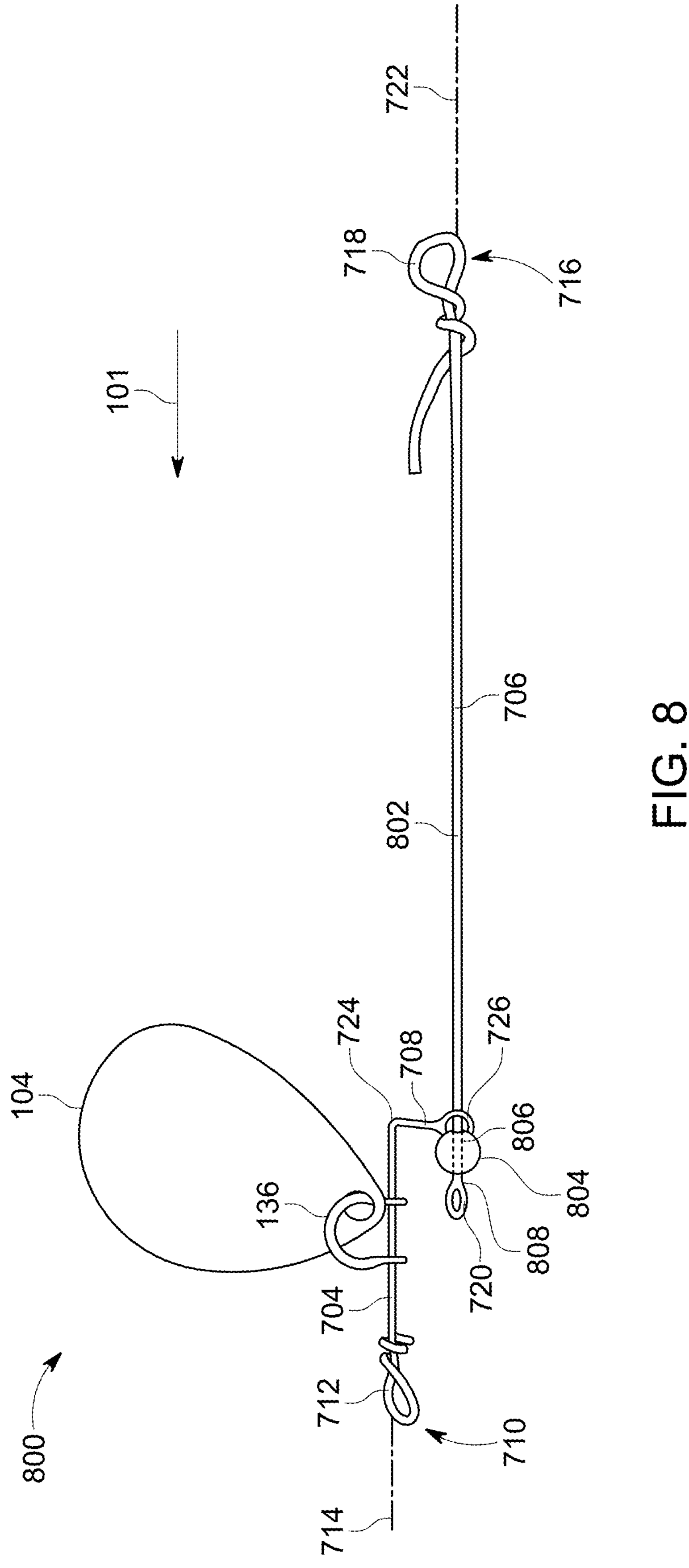
FIG. 8 is a side view of an example fishing lure having a second alternative embodiment of a frame, in accordance with one or more aspects of the present disclosure.
Figure 9:
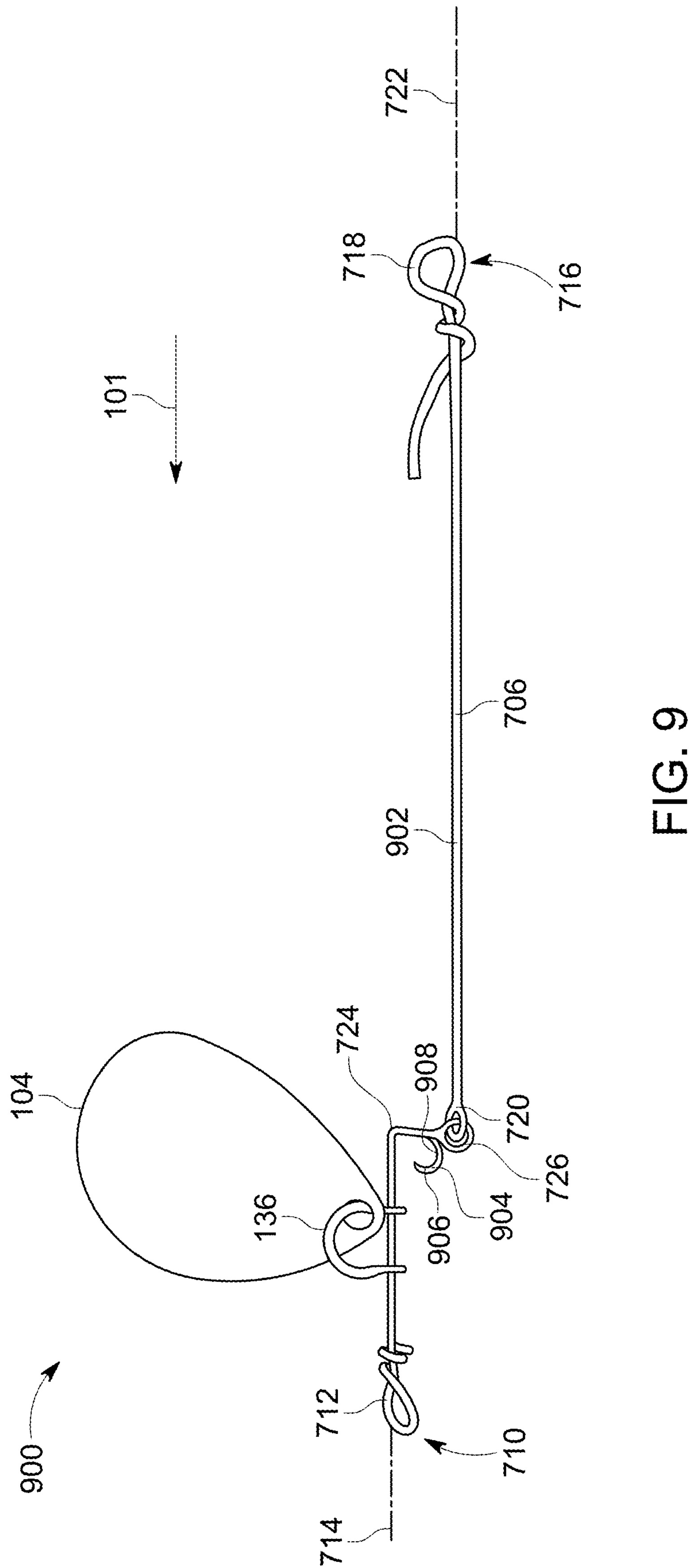
FIG. 9 is a side view of an example fishing lure having a third alternative embodiment of a frame, in accordance with one or more aspects of the present disclosure.
Figure 10:
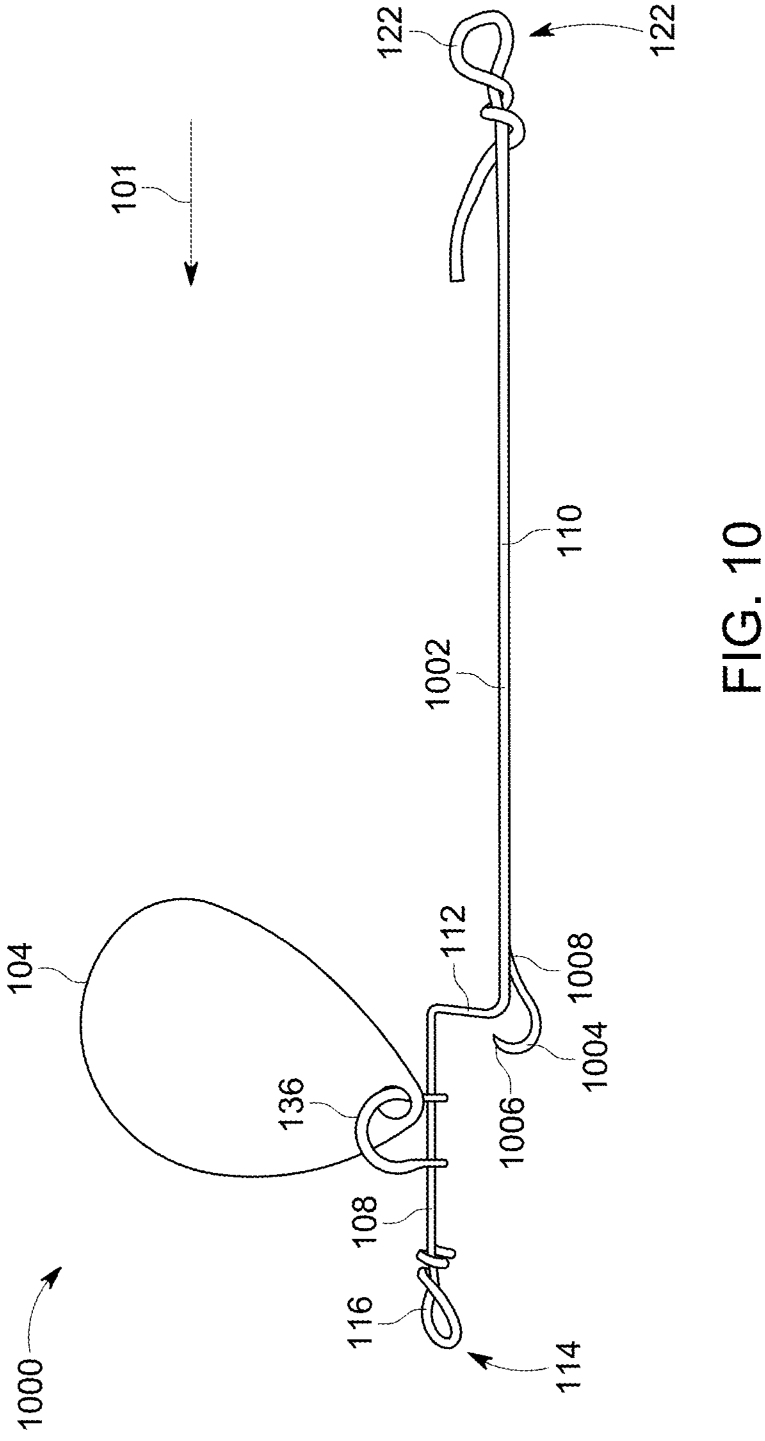
FIG. 10 is a side view of an example fishing lure having a fourth alternative embodiment of a frame, in accordance with one or more aspects of the present disclosure.
Figure 11:
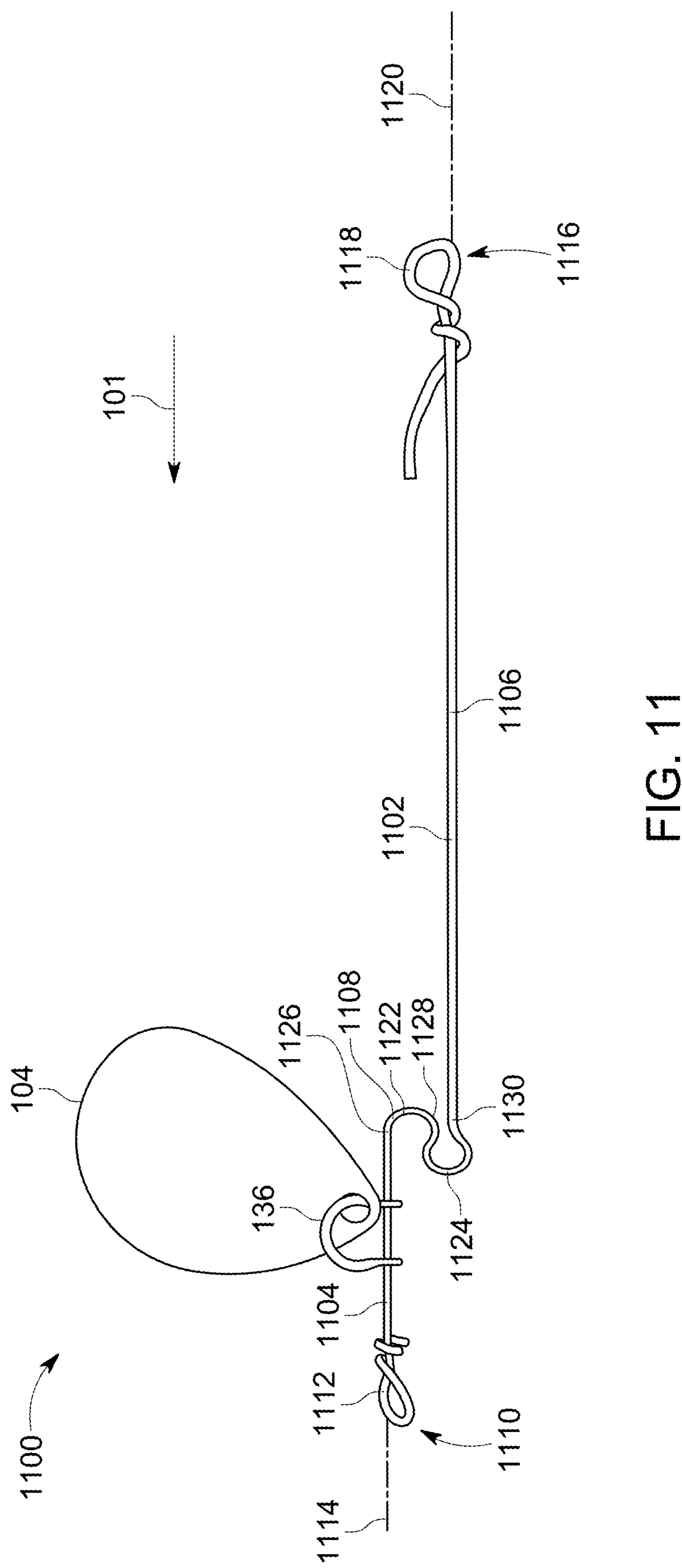
FIG. 11 is a side view of an example fishing lure having a fifth alternative embodiment of a frame, in accordance with one or more aspects of the present disclosure.

FIGS. 7-11 illustrate some possible variations to the fishing lure 100. For example, FIG. 7 shows an example fishing lure 700. As another example, FIG. 8 shows an example fishing lure 800. As another example, FIG. 9 shows an example fishing lure 900. As another example, FIG. 10 shows an example fishing lure 1000. As a further example, FIG. 11 shows an example fishing lure 1100. Although not shown, it should be understood that the fishing lures 700, 800, 900, 1000, 1100 may include one or more of the fishing hook 106, the first bead 154, the second bead 156, the third bead 158, the first weight 168, the second weight 170, the bait 204, 302, 402, 502, or any of the aforementioned variations. It should be further understood that the above-described use of the fishing lure 100 equally applies to the fishing lures 700, 800, 900, 1000, 1100, which are described in turn below.

FIG. 7 illustrates the fishing lure 700, which includes a frame 702, the spinner blade 104, and the clevis 136. Like the frame 102, the frame 702 is an elongated structure that includes a first section 704, a second section 706, and a transition section 708 extending therebetween. The first section 704, which forms a first end 710 of the fishing lure 700, may includes a first end eyelet 712 to enable attachment to the fishing line 602 (e.g., similar to that shown in FIG. 6). The first section 704, which may be substantially linear along a length thereof, defines a spinner axis 714 therealong. The second section 706, which forms a second end 716 of the fishing lure 700, includes a second end eyelet 718, to enable connection to the fishing hook 106, and a second inner eyelet 720. The second section 706, which may be substantially linear between the second end eyelet 718 and the second inner eyelet 720, defines a central axis 722 therealong that is substantially parallel to the spinner axis 714. As described above in connection with the frame 102, a length of the second section 706 may be greater than a length of the first section 704.

The transition section 708, which may have a length that is less than the length of the first section 704 or the length of the second section 706, fixedly connects to the first section 704 to define a bend 724 in the frame 702. The transition section 112 further includes a transition section eyelet 726 that movably connects to the second inner eyelet 720. Due to the shape and arrangement of the transition section 708 relative to the first section 704 and the second section 706, the second section 706 is configured to be offset to the first section 704 in a direction that is substantially perpendicular to the fishing direction 101 when the fishing lure 700 is in use. When the fishing lure 700 moves through the water in the fishing direction 101 and the spinner blade 104 rotates about the spinner axis 714, the spinner blade 104 may repeatedly strike one or both of the transition section eyelet 726 and the second inner eyelet 720, thereby generating a sound that appeals to auditory and lateral line senses of the sought-after predatory fish.

While the transition section 708 is further shown as having a substantially linear portion 728 extending between the bend 724 and the transition section eyelet 726, it should be understood that other shapes of the transition section 708 are possible. For example, similar to that described above in connection with FIG. 1, the bend 724 may be directly connected to the transition section eyelet 726. As another example, the transition section 708 may include one or more additional bends between the bend 724 and the transition section eyelet 726 (e.g., to create an undulating shape).

FIG. 8 illustrates the fishing lure 800, which includes a frame 802, the spinner blade 104, and the clevis 136. Like the frame 702, the frame 802 is an elongated structure that includes the first section 704, the second section 706, and the transition section 708 extending therebetween. However, rather than include the second inner eyelet 720 directly connected to the transition section eyelet 726, as does the frame 702, the frame 802 includes a stopper bead 804 that separates the second inner eyelet 720 from the transition section eyelet 726. The stopper bead 804, which may have a spherical shape, a cylindrical shape, and/or the like, includes a stopper bead bore 806 that slidably receives an end portion 808 of the second section 706. When the fishing lure 800 moves through the water in the fishing direction 101 and the spinner blade 104 rotates about the spinner axis 714, the spinner blade 104 may repeatedly strike one or more of the transition section eyelet 726, the second inner eyelet 720, and the stopper bead 804, thereby generating a sound that appeals to auditory and lateral line senses of the sought-after predatory fish. By adjusting one or more of the size, weight, and material of the stopper bead 804, a user may adjust the characteristics of the sound that is generated by the spinner blade 104 repeatedly striking the stopper bead 804 to attract certain types of fish.

FIG. 9 illustrates the fishing lure 900, which includes a frame 902, the spinner blade 104, and the clevis 136. Like the frame 702, the frame 902 includes the first section 704, the second section 706, and the transition section 708. The frame 902 likewise includes the second inner eyelet 720 directly connected to the transition section eyelet 726. However, in distinction from the frame 702, the frame 902 additionally includes a first branch segment 904 that generates a distinct, adjustable sound when struck by the spinner blade 104 during a fishing operation. The first branch segment 904, which may have a curved, elongated shape, includes a first branch end 906 and a second branch end 908. The first branch end 906 points in a direction toward, and is spaced apart from, at least one of the first section 704 or the transition section 708. The second branch end 908 is fixedly connected (e.g., via soldering, welding, adhering, and/or the like) to the substantially linear portion 728 of the transition section 708. In some implementations, the first branch segment 904 may be integrally formed with the transition section 708. Depending on the selected size, shape, and arrangement of the first branch segment 904, a user may adjust the characteristics of the sound generated by the spinner blade 104 repeatedly striking the first branch segment 904 to attract certain types of fish.

As described above in connection with the frame 102, the frame 702, 802, 902 may likewise be formed of one or more materials (e.g., wire, plastic, and/or the like). For example, the first section 704 may be formed of a first piece of continuous, integral material (e.g., wire, molded plastic, and/or the like), and the second section 706 and the transition section 708 may together be formed of a second piece of continuous, integral material (e.g., wire, molded plastic, and/or the like). As another example, at least a portion of the frame 702, 802, 902 (e.g., the second section 706) may be in the form of one type of material, and another portion of the frame 702, 802, 902 (e.g., the transition section 708) may be in the form of another type material that is fixedly secured to the one type of material (e.g., via welding, soldering, adhesive, and/or the like).

FIG. 10 illustrates the fishing lure 1000, which includes a frame 1002, the spinner blade 104, and the clevis 136. Like the frame 102, the frame 1002 includes the first section 108, the second section 110, and the transition section 112. However, in distinction from the frame 102, the frame 1002 additionally includes a second branch segment 1004 that generates a distinct, adjustable sound when struck by the spinner blade 104 during a fishing operation. The second branch segment 1004, which may have a curved, elongated shape similar to that of the first branch segment 904, includes a first branch end 1006 and a second branch end 1008. The first branch end 1006 points in a direction toward, and is spaced apart from, at least one of the first section 108 or the transition section 112. The second branch end 1008 is fixedly connected (e.g., via soldering, welding, adhering, and/or the like) to the second linear portion 166 of the second section 110. Additionally, or alternatively, the second branch end 1008 may be fixedly connected (e.g., via soldering, welding, adhering, and/or the like) to the second bend 128 of the frame 102. In some implementations, the second branch segment 1004 may be integrally formed with the second section 110. Depending on the selected size, shape, and arrangement of the second branch segment 1004, a user may adjust the characteristics of the sound generated by the spinner blade 104 repeatedly striking the second branch segment 1004 to attract certain types of fish.

FIG. 11 illustrates the fishing lure 1100, which includes a frame 1102, the spinner blade 104, and the clevis 136. Like the frame 102, the frame 1102 is an elongated structure that includes a first section 1104, a second section 1106, and a transition section 1108 extending therebetween. The first section 1104, which forms a first end 1110 of the fishing lure 1100, may include a first eyelet 1112 to enable attachment to a fishing line 602 (e.g., as shown in FIG. 6). The first section 1104, which may be substantially linear along a length thereof, defines a spinner axis 1114 therealong. The second section 1106, which forms a second end 1116 of the fishing lure 1100, may include a second eyelet 1118 for connection to the fishing hook 106. The second section 1106, which may be substantially linear along a length thereof, defines a central axis 1120 therealong that is substantially parallel to the spinner axis 1114. As described above in connection with the fishing lure 100, the length of the second section 1106 may be greater than the length of the first section 1104.

The transition section 1108, which may have a length that is less than the length of the first section 1104 or the length of the second section 1106, includes a transition portion 1122 and a protruding portion 1124 that forms an impact location for the spinner blade 104. When struck by the rotating spinner blade 104 during a fishing operation, the protruding portion 1124 generates a sound. The transition portion 1122 connects, at one end, to the first section 1104 to define a first bend 1126 and connects, at an opposing end, to the protruding portion 1124 to define a second bend 1128. The protruding portion 1124, which extends in a direction toward the first eyelet 1112, further connects to the second section 1106 to define a third bend 1130. Due to the shape and arrangement of the transition section 1108 relative to the first section 1104 and the second section 1106, the first section 1104 is axially offset relative to the second section 1106.

As described above in connection with the frame 102, the frame 1002, 1102 may be formed of one or more materials (e.g., wire, plastic, and/or the like). For example, the frame 1002, 1102 may be a one-piece, continuous, and integral length of material (e.g., wire, molded plastic, and/or the like). As another example, at least one section of the frame 1002, 1102 (e.g., the first section 108, 1104) may be in the form of one type of material, and another section of the frame 1002, 1102 (e.g., the second section 110, 1106 and/or the transition section 112, 1108) may be in the form of another type material. In such an example, one or more of the first section 108, 1104, the second section 110, 1106, or the transition section 112, 1108 may be fixedly secured together by welding, soldering, adhesive, and/or the like.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A fishing lure attachable to a fishing line for movement through water in a fishing direction, the fishing lure comprising:
- a first section including:
  - a leading end configured for attachment to the fishing line, and
  - a trailing end opposite the leading end;
- a spinner blade rotatably coupled to the first section between the leading end and the trailing end for rotation about a spinner axis;
- a second section configured as bait and in a trailing position relative to the first section during the movement of the fishing lure through the water,
  - wherein a central axis of the second section is offset from the spinner axis in a direction that is perpendicular to the fishing direction;
- a transition section connecting the trailing end of the first section to the second section; and
- a fishing hook coupled to the second section,
- wherein the spinner blade is configured to rotate around the spinner axis past the transition section.

2. The fishing lure of claim 1, wherein the second section is weighted such that the second section travels at a depth in the water that is deeper than a depth of the first section during the movement of the fishing lure through the water.

3. The fishing lure of claim 1, wherein the first section includes at least one first bead, and the second section includes at least one second bead.

4. The fishing lure of claim 1, wherein at least two of the first section, the second section, and the transition section are formed of a single, continuous length of wire.

5. The fishing lure of claim 1, further comprising an additional spinner blade rotatably coupled to the first section for rotation about the spinner axis.

6. The fishing lure of claim 1, wherein the second section is configured as at least one of deer hair skirting, marabou feather skirting, rubber skirting, artificial hair skirting, tinsel skirting, and an animal-resembling body.

7. The fishing lure of claim 1, wherein during the movement of the fishing lure through the water and during the rotation of the spinner blade about the spinner axis, the spinner blade strikes at least one of the transition section and the second section to generate sound.

8. A fishing lure attachable to a fishing line for movement through water in a fishing direction, the fishing lure comprising:
- a first section including:
  - a leading end that is configured for attachment to the fishing line, and
  - a trailing end opposite the leading end;

a spinner blade coupled to the first section for rotation about a spinner axis;

a second section in a trailing position relative to the first section during the movement of the fishing lure through the water, wherein a central axis of the second section is offset from the spinner axis in a direction that is perpendicular to the fishing direction, and wherein the second section is weighted such that the second section travels at a depth in the water that is deeper than a depth of the first section during the movement of the fishing lure through the water;

a transition section connecting the trailing end of the first section to the second section; and a fishing hook coupled to the second section.

9. The fishing lure of claim 8, wherein the first section forms a first end of the fishing lure, and the second section forms a second end of the fishing lure.

10. The fishing lure of claim 8, wherein the transition section fixedly connects the trailing end of the first section to the second section.

11. The fishing lure of claim 8, wherein at least one of the first section and the second section comprises a linear section of wire.

12. The fishing lure of claim 8, wherein the second section includes one or more of deer hair skirting, marabou feather skirting, rubber skirting, artificial hair skirting, tinsel skirting, and an animal-resembling body.

13. The fishing lure of claim 8, wherein the transition section and the first section connect to define a first bend in a material, and wherein the transition section and the second section connect to define a second bend in the material.

14. The fishing lure of claim 13, wherein the material is a one-piece, integral structure that forms the first section, the second section, and the transition section.

15. A fishing lure attachable to a fishing line for movement through water in a fishing direction, the fishing lure comprising:

a first section configured for attachment to a fishing line and defining a spinner axis;

a spinner blade rotatably coupled to the first section for rotation about the spinner axis;

a second section in a trailing position relative to the first section during the movement of the fishing lure through the water, wherein the second section defines a central axis that is axially offset from the spinner axis in a direction perpendicular to the fishing direction;

a transition section connecting the first section to the second section; and a fishing hook coupled to the second section, wherein during the movement of the fishing lure through the water, the spinner blade rotates about the spinner axis and repeatedly strikes at least one of the transition section and the second section without changing a direction of rotation to generate sound.

16. The fishing lure of claim 15, wherein the first section includes a first eyelet for connection to the fishing line, and the second section includes a second eyelet that is coupled to the fishing hook.

17. The fishing lure of claim 15, wherein the fishing lure has a center of gravity that causes the second section to travel at a depth in the water that is deeper than a depth of the first section during the movement of the fishing lure through the water.

18. The fishing lure of claim 15, wherein the first section is a first linear section of a first material, and the second section is a second linear section of a second material.

19. The fishing lure of claim 18, wherein the first material has a same material composition as the second material.

20. The fishing lure of claim 15, wherein a length of the transition section is less than a length of the first section, and the length of the transition section is less than a length of the second section.

* * * * *